3,356,701
BLEACHING REFINED COTTON OIL
Paul H. Eaves, Metairie, La., assignor to the United States of America as represented by the Secretary of Agriculture
No Drawing. Filed Nov. 24, 1965, Ser. No. 509,614
2 Claims. (Cl. 260—424)

ABSTRACT OF THE DISCLOSURE

A process for bleaching refined cottonseed oil is carried out by preparing an aqueous slurry of activated alumina of relatively small particle size and mixing with refined cottonseed oil at very high shear conditions, of such intensity that the alumina agglomerates are broken up into their ultimate particle size and dispersed throughout the oil, then heating the mixture under vacuum, cooling, and mechanically separating the oil from the slurry.

A non-exclusive, irrevocable, royalty-free license in the invention herein described, throughout the world for all purposes of the United States Government, with the power to grant sublicenses for such purposes, is hereby granted to the Government of the United States of America.

This invention relates to the improvement of a process for bleaching refined cottonseed oil. More specifically this invention relates to a process for bleaching refined cottonseed oil with activated alumina. The original process which we have improved is described in U.S. Patent No. 3,036,102.

The primary object of this invention is to provide an improvement of a still useful original process, the instant improvement enhancing significantly the bleaching efficiency of any given activated alumina.

A second object is to provide a novel improvement of the original process whereby a given refined oil can be bleached to a lighter color by a given quantity of activated alumina than is possible by application of the original process as described.

A third object is to provide an improvement of the original process by means of which a given refined cottonseed oil can be bleached to a desired residual color level by the use of smaller quantities of activated alumina than is possible by the said original process.

A fourth object is to provide a bleaching process to produce bleached cottonseed oils which are essentially deodorized and which are suitable for use as salad and cooking oils with only a minimum of further treatment such as steam deodorization.

The process for bleaching cottonseed oil with activated alumina, as described in U.S. Patent No. 3,036,102, consists of mixing finely divided activated alumina in the form of a dry solid containing a minimum of 10% by weight of adsorbed moisture with refined cottonseed oil, heating the mixture to at least 437° F. (225° C.), holding the mixture at this temperature for 5 to 30 minutes, cooling the heated mixture to about 162° F. (75° C.) and filtering the spent activated alumina from the oil. It is further stated in Patent 3,036,102 that the effectiveness of activated alumina as a bleaching agent for cottonseed oil is dependent on its moisture content, the particle size of the activated alumina, and the temperature of bleaching.

The instant invention, which is a significant improvement of the original process, consists of the discovery that additional factors, such as the manner in which the alumina is incorporated into the oil and the degree of dispersion of the alumina throughout the oil, are profoundly significant in realizing the maximum bleaching effect for any given alumina.

In experiments utilizing the alumina bleaching method as described in the original invention, but using larger quantities of oil and alumina, it was found that duplicate experiments did not yield duplicate results with respect to the color of the bleached oils produced, the oil colors from duplicate experiments often differing by as much as 1 Lovibond red color unit. This difficulty was found to arise from the fact that the finaly divided particles of activated alumina, on the order of 1 micron to 40 microns in diameter, adhere together to form aggregates which are extremely resistant to mechanical dispersion. In the aforementioned experiments the alumina containing 10% or more of adsorbed water had been mixed into the oil by means of a propeller-type agitator. When the alumina containing 10% or more of adsorbed water was incorporated into the oil by the use of high intensity blending, such as provided by a Waring Blendor, the variation in experimental results was minimized and a pronounced improvement in the bleaching effect of a given alumina, as compared to the bleaching effect when propeller-type mixing was employed, was obtained. It was further and more importantly found that when the alumina was mixed with water, in the proportion of from 1 to 6 parts of water to 1 part of alumina by weight, to form a slurry or suspension of alumina in water and the alumina in water slurry or suspension then blended into the oil by the use of high intensity mixing such as is provided by a Waring Blendor or a high speed cavitator type impeller, a dramatic and unexpected improvement in the bleaching effect for any given alumina, as compared to the bleaching effect using either propeller or high intensity blending to mix alumina in the form of a dry solid containing 10% or more of adsorbed water into the oil, was obtained.

In the instant invention a slurry or suspension of activated alumina in water in the proportions of 1 part of activated alumina to 1 to 6 parts of water by weight is incorporated into the oil by means of a mixing or blending device providing hydraulic attrition of sufficient intensity to break up the wetted activated alumina aggregates into their ultimate particle size and disperse them throughout the oil to form a relatively stable suspension of activated alumina particles surrounded by water-oil emulsion throughout the oil. The mixture of oil, activated alumina, and water is then charged to a suitable evacuated vessel and maintained under vacuum while being agitated until entrained and dissolved air has been removed. After de-aeration, the mixture is heated to about from 430° F. (220° C.) to 460° F. (240° C.) while under vacuum and while being continuously agitated, with the heating rate being regulated to require about from 30 to 60 minutes to reach the desired temperature. The heated mixture is maintained at about from 430° F. (220° C.) to 460° F. (240° C.) under 1.0 to 10.0 mm. Hg absolute pressure and with continuous agitation for about from 5 to 30 minutes. It is then cooled to about from 180° F. (82.2° C.) to 200° F. (93.3° C.) and filtered to separate the spent alumina from the bleached oil.

The instant invention can be generally described in this manner. This invention is an improved process for bleaching refined cottonseed oil with activated alumina comprising this series of steps:

(a) Dispersing activated alumina made up of particles ranging from 0.5 to 40 microns in diameter, in about from 2 to 6 parts by weight of water, to form a fluid slurry, (b) Mixing the fluid slurry at high speeds of agitation with the refined cottonseed oil for about from 1 to 5 minutes, (c) Heating the agitated mixture under vacuum of about from 1 to 5 mm. mercury at about from 430° F.

(220° C.) to 460° F. (240° C.) for about from 20 to 60 minutes of time, (d) Cooling the mixture under vacuum to about from 180° F. (82.2° C.) to 200° F. (93.3° C.), and (e) Mechanically separating the oil from the slurry.

It must be pointed out that steps (c) and (d) can be carried out successfully in an inert atmosphere—such as nitrogen—in place of the recommended vacuum.

The instant invention differs from U.S. Patent 3,036,102 invention in that the activated alumina is added to the oil to be bleached as a slurry or suspension of activated alumina in water, such that the individual ultimate particles of activated alumina are completely saturated and coated with water before incorporation into the oil, and that high intensity mixing or blending is employed to disperse the water saturated or coated ultimate particles of alumina throughout the oil to a degree not attainable when the alumina is mixed into the oil as a dry solid. Slurrying the activated alumina with or suspending it in water prior to incorporating it into the oil serves to destroy or nullify the forces which bind or bond the individual ultimate particles of alumina into aggregates and enables thorough dispersion of the alumina throughout the oil to a degree not possible when the alumina is mixed into the oil as a dry solid powder containing only chemisorbed water.

The utility and beneficial effects of incorporating the activated alumina into the oil in the above-described manner is illustrated by the following example.

*Example 1*

A series of activated alumina samples prepared from the same commercial source material by progressively finer grinding were employed. These activated aluminas were identical in every respect with the exception of degree of fineness. The particle size of these aluminas was as shown in Table I.

TABLE I

| Activated Alumina No. | Particle Size (Percent smaller than the particle diameter in microns shown) | | | | | | | |
|---|---|---|---|---|---|---|---|---|
| | Microns | 44 | 30 | 25 | 20 | 15 | 10 | 5 |
| 1 | Percent by weight | 39 | 29 | 24 | 20 | 17 | 14 | 9 |
| 2 | do | 66 | 46 | 38 | 32 | 28 | 16 | 10 |
| 3 | do | 77 | 52 | 48 | 39 | 32 | 27 | 14 |

The refined oil used had a red color of 10.2 as refined oil and bleached to a red color of 6.6 by the Official Bleaching Method of the American Oil Chemists' Society using Official Natural Earth. The colors of the refined and the bleached oils are expressed as Lovibond red color units as determined by the Official Wesson Method of the American Oil Chemists' Society.

The bleaching experiments were carried out at identical conditions and with identical quantities of activated alumina and refined oil and differed only in the method use for incorporating the activated alumina into the oil. For all of the experiments 1,200 grams of oil and 48 grams of activated alumina (moisture-free basis) were used. The mixtures of oil and activated alumina were charged to the evacuated bleaching kettle, de-aerated for 10 minutes, heated to 440° F. under vacuum while being continuously agitated, maintained at 440° F. for 20 minutes under vacuum with continuous agitation, cooled to 180° F. under vacuum and agitation, and filtered. The colors of the bleached oils obtained in the experiments are given in Table II. In obtaining the oil colors shown in the table under the column heading "Propeller mixing" the dry solid activated aluminas containing from 11.7% to 12.8% of adsorbed moisture were mixed into the oil for 5 minutes in a cone-bottom vessel 4 inches in diameter fitted with 3 baffles, by means of a 2-inch diameter, 3-blade propeller, turning at 1,200 revolutions per minute. The oil colors shown under the heading "High intensity mixing" were obtained by blending the activated aluminas into the oil in a standard Waring Blendor for 1 minute. The oil colors tabulated under the head "Wet mixing" were obtained when the activated alumina was thoroughly shaken with 6 parts by weight of water and blended into the oil in a Waring Blendor.

TABLE II

| Activated Alumina No. | Bleached oil colors, Lovibond red units | | |
|---|---|---|---|
| | Propeller mixing | High intensity mixing | Wet mixing |
| 1 | 4.6 | 4.0 | 3.1 |
| 2 | 3.4 | | 1.6 |
| 3 | 5.2 | 2.9 | 0.9 |

What is claimed is:

1. A process for bleaching refined cottonseed oil with activated alumina comprising
    (a) dispersing activated alumina made up of particles ranging about from 0.5 to 40 microns in diameter, in about from 2 to 6 parts by weight of water, to form a fluid slurry,
    (b) mixing the fluid slurry at high speeds of agitation with the refined cottonseed oil for about from 1 to 5 minutes,
    (c) heating the agitated mixture under vacuum of about from 1 to 5 mm. mercury at about from 430° F. (220° C.) to 460° F. (240° C.) for about from 20 to 60 minutes of time,
    (d) cooling the mixture under vacuum to about from 180° F. (82.2° C.) to 200° F. (93.3° C.), and
    (e) separating the oil from the slurry.

2. The process of claim 1 wherein the heating in step (c) and the cooling in step (d) of the process are carried out in an inert atmosphere.

References Cited

UNITED STATES PATENTS 3,036,102   5/1962   Pons et al.   260—425

ALEX MAZEL, *Primary Examiner.*

HENRY R. JILES, *Examiner.*

A. M. TIGHE, *Assistant Examiner.*